United States Patent
Xu et al.

(10) Patent No.: US 11,889,793 B2
(45) Date of Patent: Feb. 6, 2024

(54) INTERNET-OF-THINGS MANAGEMENT AND CONTROL SYSTEM FOR INTELLIGENT ORCHARD

(71) Applicant: Shandong Academy of Agricultural Machinery Sciences, Jinan (CN)

(72) Inventors: Ning Xu, Jinan (CN); Jianming Kang, Jinan (CN); Qingshan Meng, Jinan (CN); Mengmeng Niu, Jinan (CN); Tao Li, Jinan (CN); Qiangji Peng, Jinan (CN); Na Guo, Jinan (CN)

(73) Assignee: Shandong Academy of Agricultural Machinery Sciences, Jinan (CN)

(*) Notice: Subject to any disclaimer, the term of this patent is extended or adjusted under 35 U.S.C. 154(b) by 0 days.

(21) Appl. No.: 18/134,063

(22) Filed: Apr. 13, 2023

(65) Prior Publication Data
US 2023/0329159 A1 Oct. 19, 2023

(30) Foreign Application Priority Data
Apr. 14, 2022 (CN) .......................... 202210388669.7

(51) Int. Cl.
*A01G 17/00* (2006.01)
*G16Y 40/35* (2020.01)
*G16Y 10/05* (2020.01)

(52) U.S. Cl.
CPC ............ *A01G 17/005* (2013.01); *G16Y 10/05* (2020.01); *G16Y 40/35* (2020.01)

(58) Field of Classification Search
CPC ...... A01G 17/005; A01G 17/00; G16Y 40/35; G16Y 10/05
See application file for complete search history.

(56) References Cited

U.S. PATENT DOCUMENTS

2018/0330486 A1* 11/2018 Cohen .................. G06T 7/0004
2021/0012109 A1* 1/2021 Chou ................... G06V 10/752

FOREIGN PATENT DOCUMENTS

| CN | 101477595 A | | 7/2009 | |
|---|---|---|---|---|
| CN | 109168535 A | | 1/2019 | |
| CN | 109191074 A | | 1/2019 | |
| CN | 111399508 A | | 7/2020 | |
| CN | 111563625 A | * | 8/2020 | ............ G06Q 10/04 |

(Continued)

*Primary Examiner* — Kristen C Hayes
(74) *Attorney, Agent, or Firm* — Bayramoglu Law Offices LLC

(57) ABSTRACT

An Internet-of-Things management and control system for an intelligent orchard includes a server, agricultural machinery equipment, an image acquisition apparatus disposed on the site, and various sensors. The agricultural machinery equipment, the image acquisition apparatus and the various sensors are in communication connection with the server. The server includes an orchard management subsystem and an information monitoring subsystem. The orchard management subsystem includes a fruit tree planting planning module, a task management module and various information management modules, and the information monitoring subsystem includes a meteorological environment monitoring module, a soil moisture monitoring module and a disease and pest monitoring module. According to the Internet-of-Things management and control system, all-round management for an orchard from planning to picking can be achieved.

4 Claims, 1 Drawing Sheet

(56) References Cited

FOREIGN PATENT DOCUMENTS

| | | |
|---|---|---|
| CN | 111709379 A | 9/2020 |
| CN | 112931072 A | 6/2021 |
| CN | 113177345 A | 7/2021 |
| CN | 113409023 A | 9/2021 |
| WO | 2019245122 A1 | 12/2019 |

\* cited by examiner

INTERNET-OF-THINGS MANAGEMENT AND CONTROL SYSTEM FOR INTELLIGENT ORCHARD

CROSS REFERENCE TO THE RELATED APPLICATIONS

This application is based upon and claims priority to Chinese Patent Application No, 202210388669.7, filed on Apr. 14, 2022, the entire contents of which are incorporated herein by reference.

TECHNICAL FIELD

The present disclosure belongs to the technical field of big data assisted orchard management, in particular relates to an Internet-of-Things management and control system for an intelligent orchard.

BACKGROUND

Statements in this section only provide background technical information related to the present disclosure and do not necessarily constitute the prior art.

In the face of new requirements of modern agricultural production, a traditional orchard has gradually transitioned to an intelligent orchard in combination with the Internet of Things, big data and an artificial intelligence technology. The existing intelligent orchard system at least has the following problems.

On one hand, the current intelligent orchard mostly adopts a multifunctional operation platform covering a plurality of functions such as sowing, fertilizing, picking and monitoring and carries a plurality of sensors and monitoring apparatuses such as temperature and humidity sensors, a GPS, a gyroscope, a lidar, a multi-channel camera; a spraying flow sensor and an operation position sensor. When the platform autonomously operates, information sensed by the various sensors is needed to be uploaded to a server in time; for achieving accurate operation, data collected by the existing sensors is generally aggregated to an Internet-of-Things gateway so as to be uniformly transmitted; when being transmitted by the gateway, the data can be transmitted according to an order of time stamps carried by data packets, which causes incapability of rapidly transmitting the data having timeliness requirements for data uploading and instruction feedback; and particularly, the bandwidth will be occupied for a long time when data such as a video image is transmitted, which causes higher instability in transmission of other data. Therefore, it is urgent to optimize a transmission method, increase the transmission efficiency and solve the problems of long data transmission time and high network resource occupation.

On the other hand, edge features of different kinds of pests are relatively close, especially, features such as shapes and physical appearances of larvae of some pests are very close, which easily causes relatively great recognition errors. At the same time, a background of a photo will further interfere with the accuracy of recognition. If the recognition precision is to be improved, a large number of images are needed for training, which brings a burden for manual marking and also brings a high operation pressure during model training.

SUMMARY

In order to overcome defects in the above-mentioned prior art, the present disclosure provides an Internet-of-Things management and control system for an intelligent orchard, by which all-round management for an orchard from planning to picking can be achieved.

In order to achieve the above-mentioned objective, one or more embodiments of the present disclosure provide the following technical solutions:

a server includes an orchard management subsystem and an information monitoring subsystem, wherein the orchard management subsystem includes a fruit tree planting planning module configured to perform the following steps:

acquiring regional image data, topographic data and geological environment data;

acquiring a mark made by a user with respect to an orchard planting area, and dividing grids within the range;

estimating planting conditions of each grid on the basis of the topographic data and the geological environment data;

with the minimum planting area of a similar fruit tree area and differences of ideal planting conditions and estimated planting conditions of fruit trees to be planted as constraints, merging the grids into a plurality of plots according to the planned planting area of the fruit trees to be planted, and obtaining species of corresponding fruit trees in each plot;

further, estimating light conditions of each grid on the basis of the topographic data, which includes: simulating a solar elevation angle of the planting area in a day, and calculating an average daily sunshine duration of each grid as the light conditions on the basis of a geographic elevation model; and further, estimating soil conditions of each grid on the basis of the geological environment data, which includes: performing interpolation on the basis of soil condition data of all sampling points to obtain soil condition distribution of the planting area; and acquiring the soil conditions in each grid by spatial overlay analysis in combination with grid division data.

Further, the orchard management subsystem includes a task management module configured to acquire an agricultural production task plan made by working staff and issue the agricultural production task plan to the corresponding agricultural machinery equipment and working staff.

Further, the information monitoring subsystem includes a meteorological environmental monitoring module configured to monitor meteorological information of a ground surface of an orchard in real time and early warn abnormal weather in local areas in combination with meteorological data collected in real time.

Further, the information monitoring subsystem includes a disease and pest monitoring module configured to acquire images of the fruit trees and monitor diseases and pests on the basis of a preset disease and pest recognition model.

Further, the disease and pest recognition model is trained by a disease and pest training image, and the model includes a first convolution module, a second convolution module, a third convolution module, a fourth convolution module, a fifth convolution module and three fully-connected layers which are connected in sequence, wherein each of the first convolution module and the second convolution module is formed by a convolution layer, a local response standard layer and a maximum pooling layer, and the fifth convolution module is formed by a convolution layer and a maximum pooling layer.

One or more embodiments provide an Internet-of-Things management and control system for an intelligent orchard, including the server, agricultural machinery equipment, an image acquisition apparatus disposed on the site and various sensors, wherein the agricultural machinery equipment, the image acquisition apparatus and the various sensors are in communication connection with the server.

Further, the server is in communication with other devices by a communication gateway, and the communication gateway is configured to:
acquire a data message to be sent to the server, and determine a priority to which the data message belongs according to a data source and a preset priority rule; and
if the priority is lower, transfer data into a data register for arrangement by queue, and write the data into a message cache area; and when the data stored in the message cache area meets transmission conditions, encapsulate the data stored in the message cache area to generate a message to be sent.

Further, the system further includes a client side connected to the server.

The one or more technical solutions mentioned above have the following beneficial effects.

According to the present disclosure, the planting conditions of the planting area can be estimated on the basis of the topographic data and the geological environment data, at the same time, automatic plot division and fruit tree distribution can be achieved under area constraints of unit planting plots and ideal planting condition constraints of the fruit trees to be planted, and thus, reference is provided for the working staff, and the work efficiency is increased.

According to the present disclosure, all-round management for an orchard from planning to picking, including early orchard planting planning, task allocation, task operation monitoring, environment monitoring, etc. can be achieved, and intelligent management for the orchard is achieved.

For solving the problems of large transmitted data volume and high concurrency, a priority-based data transmission scheduling method is further provided, and thus, the timeliness of high-priority data transmission is guaranteed.

According to the present disclosure, a disease and pest model is trained on the basis of a transfer learning thought, the model can be optimized by adopting fewer training samples, and therefore, the efficiency is higher.

BRIEF DESCRIPTION OF THE DRAWINGS

The accompanying drawings of the description constituting one part of the present disclosure are provided for further understanding of the present disclosure. The illustrative embodiments of the present disclosure and descriptions thereof serve to explain the present disclosure, rather than to improperly limit the present disclosure.

DETAILED DESCRIPTION OF THE EMBODIMENTS

Figure 1:
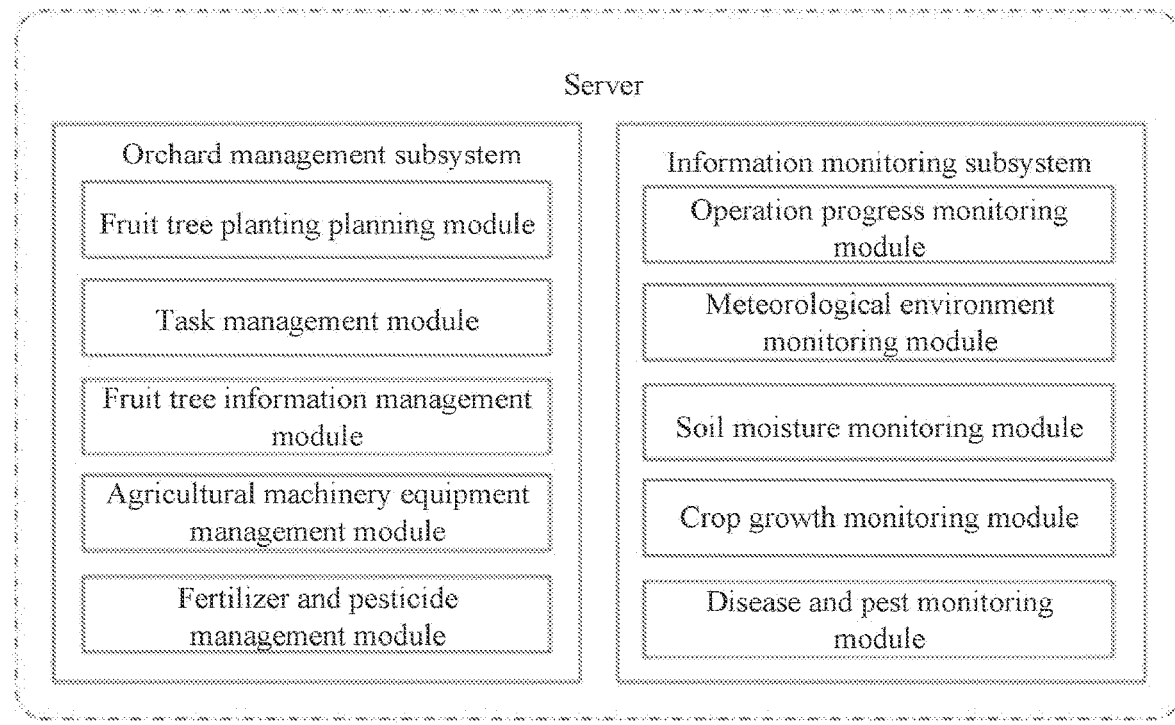
FIG. 1 is a functional architecture diagram of a server of an Internet-of-Things management and control system for an intelligent orchard in an embodiment of the present disclosure.
Figure 2:
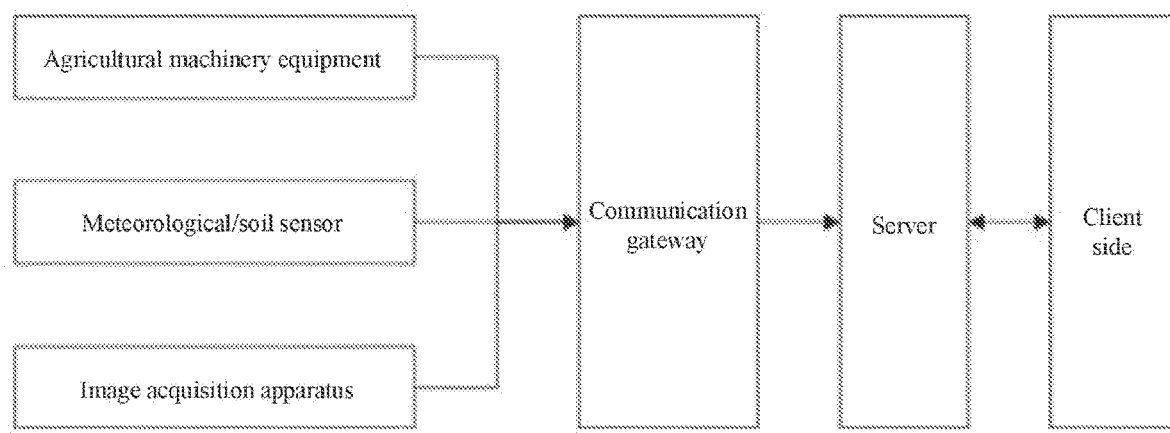
FIG. 2 is an architecture diagram of an Internet-of-Things management and control system for an intelligent orchard in an embodiment of the present disclosure.

It should be indicated that the following detailed descriptions are exemplary and are intended to provide further descriptions for the present disclosure. Unless otherwise specified, all technical and scientific terms used herein have the same meanings as those commonly understood by those of ordinary skill in the art to which the present disclosure belongs.

It should be noted that terms used herein are only intended to describe specific implementations, rather than to limit exemplary implementations according to the present disclosure. As used herein, a singular form is also intended to include a plural form unless it is explicitly indicated in the context otherwise. In addition, it should be further understood that when terms "include" and/or "comprise" are used in this description, it is indicated that there are features, steps, operations, devices, components and/or combinations thereof.

The embodiments in the present disclosure and features in the embodiments can be combined with each other without conflicts.

The present embodiment discloses an Internet-of-Things management and control system for an intelligent orchard, which autonomously operates on the basis of a multifunctional platform and includes a server, agricultural machinery equipment, an image acquisition apparatus disposed on the site and various sensors, wherein the agricultural machinery equipment, the image acquisition apparatus and the various sensors are in communication connection with the server.

The various sensors include meteorological sensors and soil sensors, wherein the meteorological sensors include temperature and humidity sensors, a light sensor, a rainfall sensor, a wind speed and direction sensor; an air pressure sensor, a gas concentration sensor, etc.; and the soil sensors include a soil water tension sensor, a soil temperature sensor, a soil humidity sensor, a water level sensor, a dissolved oxygen content sensor, a pH value sensor, etc.

The image acquisition apparatus adopts a dome camera with a pan-tilt head, including 720-DEG rotation, zooming-in, zooming-out, etc., supports video capture, supports historical video surveillance viewing and performs remote historical video playback after playback time is set.

The agricultural machinery equipment includes a plant protection spraying machine, a ditching and fertilizing machine, an inspection robot, etc., wherein the inspection robot is provided with a camera for inspecting an orchard and checking diseases and pests.

The server includes an orchard management subsystem and an information monitoring subsystem.

The orchard management subsystem is configured to include:
a fruit tree planting planning module configured to acquire species and a planned planting area of fruit trees to be planted and perform plot division on a planting area according to ideal planting conditions of the fruit trees to be planted to generate a planting task, and including:
a data acquisition unit configured to acquire regional image data, topographic data and geological environment data, wherein the image data and the topographic data can be surveyed and mapped by an unmanned aerial vehicle; specifically, the topographic data is digital elevation model data; the geological environment data is data obtained during early survey and site selection for the orchard and includes soil texture, the depth of a soil layer, ventilation and moisture states of soil, the pH of the soil, soil moisture, etc;
a grid division unit configured to acquire a mark made by a user with respect to an orchard planting area and divide grids within the range to be confirmed by the user, wherein sizes of the grids are adjustable for the user as required;

a planting environment evaluation unit configured to estimate planting conditions of each grid on the basis of the topographic data and the geological environment data, wherein the planting conditions include light conditions, soil conditions, etc;

wherein, specifically, the light conditions of each grid are estimated on the basis of the topographic data, which includes: a solar elevation angle of the planting area in a day is simulated, and an average daily sunshine duration of each grid is calculated as the light conditions on the basis of a geographic elevation model; and the soil conditions of each grid are estimated on the basis of the geological environment data; the geological environment data acquired by the above-mentioned data acquisition unit is obtained by sampling and performing site measurement at sampling points, and therefore, the geological environment data is a point value; in order to obtain the soil conditions in all the grids, in the present embodiment, interpolation is performed on the basis of soil condition data of all the sampling points to obtain soil condition distribution of the planting area; and then, the soil conditions in each grid are acquired by spatial overlay analysis in combination with grid division data;

a planting planning unit configured to, with the minimum planting area of a similar fruit tree area and differences of the ideal planting conditions and estimated planting conditions of the fruit trees to be planted as constraints, merge the grids into a plurality of plots according to the planned planting area of the fruit trees to be planted and obtain species of corresponding fruit trees in each plot to be confirmed by the user. Of course, in the process, the user is able to adjust the parameters, such as the planting area of the fruit trees according to a system division result and is also able to perform self-defined modification on the system division result. By the above-mentioned constraints, it is ensured that the fruit trees are not distributed more dispersedly on the basis that the fruit trees can cooperate with the planting conditions of the plots;

wherein, the above-mentioned planting planning module is mainly applied to an early planning stage of the orchard and provides reference for the user;

a fruit tree information management module configured to manage serial numbers, varieties, planting batches, planting time, planting sites, planting plot numbers, responsible person information, etc. of the fruit trees;

a task management module configured to acquire an agricultural production task plan made by working staff and issue the agricultural production task plan to the corresponding agricultural machinery equipment and working staff so that the agricultural machinery equipment operates according to the task plan, wherein the working staff can remotely monitor an operation progress by a client side. Agricultural production tasks include agricultural inspection, pesticide application, fertilization, disease and pest check, etc, and the agricultural production task plan includes the plots on which agricultural tasks are to be carried out and types of the agricultural production tasks. Furthermore, an operation path of agricultural machinery is further planned with specific to the agricultural production tasks;

an agricultural machinery equipment management module configured to manage serial numbers, types, operation plots, vehicle-mounted GPS device information, etc. of the agricultural machinery equipment; and a fertilizer and pesticide management module configured to perform information management on each fertilizer/pesticide material. The in and out of agricultural material inputs are accurately recorded in real time, so that a manager can master use conditions of materials in real time and performs corresponding agricultural activities in time. Fertilizer information mainly includes names, manufacturers, brands, specifications, models, production dates, stocks and stockout of fertilizers and pesticides.

The information monitoring subsystem is configured to include:

an operation progress monitoring module configured to acquire position information and posture information of the agricultural machinery equipment in real time and determine whether the agricultural machinery equipment operates according to the task plan;

a meteorological environmental monitoring module configured to monitor meteorological information, such as an air temperature and humidity; light, a rainfall, a wind speed, a wind direction, an atmospheric pressure and a gas concentration, of a ground surface of an orchard in real time; and at the same time, provide weather forecast within 72 h in the further in combination with meteorological data collected in real time by China Meteorological Administration's satellite to early warn abnormal weather, such as an air temperature, a precipitation probability, high wind and extreme weather, in local areas within 24 hour in the future;

a soil moisture monitoring module configured to accurately monitor information such as a soil water tension, a soil temperature, a soil humidity, a water level, a dissolved oxygen content and a pH value of the orchard in real time and early warn soil moisture by data management analysis at the same time, thereby providing a large amount of data for production staff to master soil information and rapidly make a production decision;

a crop growth monitoring module configured to check growth and development states of crops on a base in real time, monitor crop growth information all weather and monitor on-site daily work and security conditions, etc. at the same time by deploying a network camera monitoring device and a high-definition image acquisition device on site; and a disease and pest monitoring module configured to acquire images of the fruit trees, monitor diseases and pests on the basis of a preset disease and pest recognition model and send warning information to the client side if the diseases and the pests are recognized.

In the present embodiment, a model is finely adjusted by taking AlexNet as a pre-trained model and using a transfer learning method, and the adjusted model includes a first convolution module, a second convolution module, a third convolution module, a fourth convolution module, a fifth convolution module and three fully-connected layers which are connected in sequence, each of the first convolution module and the second convolution module is formed by a convolution layer, a local response standard layer and a maximum pooling layer, the fifth convolution module is formed by a convolution layer and a maximum pooling layer, each of the first two fully-connected layers includes a dropout layer, and some connections are randomly discarded during training. By sufficiently utilizing extensive knowledge acquired by an ImageNet data set of the AlexNet pre-trained model, the classification and recognition of the images of the diseases and the pests can be optimized by adopting limited disease and pest training images on the basis of the adjusted model.

AlexNet creatively replaces the previous Sigmoid function with a relay activation function. It has the advantage that the invariance of a rotation space and weight sharing are maintained, Therefore, due to the integration of local information, parameters of the model are reduced, and the adaptability of the model is improved. It further maintains the stable structure of a BP neural network and the ability of adapting to complex problems.

Data such as a (IPS position, posture information and operation information acquired by a multifunctional platform sensor is rapidly and accurately transmitted and uploaded to the server by a mobile network.

The server is in communication connection with other devices such as the agricultural machinery equipment and the sensors by a communication gateway.

The communication gateway is used for scheduling the transmission of data to be uploaded to the server in order to overcome the situation that the operation information is not uploaded in time due to overlarge transmission data and excessively frequent data transmission and is specifically configured to:

(1) transmit data in a message manner in a wireless transmission manner, wherein target data to be transmitted is loaded in a load of a transmitted message; acquire a data message to be sent to the server, and determine a priority to which the data message belongs according to a data source and a preset priority rule; wherein the priority rule is determined according to a type of the current operation, types of the sensors and a requirement for timeliness, specifically, data (such as a position, a speed and a posture) with higher collection efficiency is marked to have a priority in transmission, and the priority of data (such as a real-time video and a meteorological environment) with a large data volume and low real-time performance is lower. When a complex operation such as picking is performed, a priority is given to guarantee data transmission and instruction feedback of accurate operations, the communication of other non-essential data is paused until a current action unit is completed, and then, other data transmission functions are restored: and (2) if the priority is lower, transfer data into a data register for arrangement by queue, and write the data into a message cache area; when the data stored in the message cache area meets transmission conditions, encapsulate the data stored in the message cache area to generate a message to be sent; and send the generated message to be sent to the server, wherein the transmission conditions can be any one of the following conditions: A, the data stored in the message cache area reaches or exceeds a threshold, wherein the threshold is set according to the maximum load length which can be borne by the message to be sent; and B, a duration when the message is written into the cache area exceeds a preset threshold.

The data volume of data collected at high frequency is generally smaller, and a plurality of smaller data packets can be automatically encapsulated to form larger data frames to be transmitted under the condition that there are no interference to the data packets. The data packets are unpacked and recombined by the scheduling system and are then actively encapsulated to form the data frames to be pushed to a data link layer, and after the data packets are unpacked, priorities are marked on mark bits in order to ensure that priority markers can be extracted for different solutions when the data packets are encapsulated to form the data frames to be transmitted on the data link layer, and at the same time, the unpacked data packets are uniformly marked on a marker position so that the data packets in the same data segment can be recognized when being received, which is beneficial to rapid transmission and rapid analysis; and the recombined data frames are certainly smaller than the maximum value of an Mill on the data link layer, which effectively avoids disordered combination and passive splitting of the data packets.

The communication gateway actively replies to a confirmation message from a data packet sender, thereby avoiding repeated sending from the sender. At the same time, it actively, intercepts cached data transmission and the message connected to a server side and make a reply, so that it is ensured that the register can arrange cached data in order to be sent to the server, and message conflicts caused by data cache between a data sender and the server are avoided.

In the present embodiment, an uploading order of data collected by the various different types of sensors and an occupied mobile bandwidth are reasonably controlled according to the data collection frequency and the degree of priority, and at the same time, when an operation platform accurately operates, a priority can be given to the system to guarantee the transmission communication of parameters required by operation control.

The scheduling system dynamically adjusts the data collection frequency according to a state of the operation platform. When the multifunctional operation platform only puts a self-walking function to use, data collection frequencies of the sensors are defaulted to be set according to a running speed.

The client side is configured to include:

a communication scheduling control module configured to manage the priority rule adopted by the communication gateway;

an operation monitoring module configured to acquire a position and historical operation track of the agricultural machinery equipment, wherein the track can be played back in a form of animation;

a data query module configured to view the meteorological sensors in a map mode and a card mode and mark real-time states (normal, disconnection and early warning) of the sensors according to icon colors of the meteorological sensors, wherein icons of the sensors in the map mode support position self-definition achieved by dragging;

an information warning module configured to receive early warning information about a meteorological environment, soil moisture, crop growth or diseases and pests; and a data analysis module configured to acquire historical monitoring data and perform data analysis, for example, a relationship between a change condition of a weather environment and the growth of the fruit trees is analyzed; application conditions of pesticides and fertilizers are counted and compared according to time intervals, use frequencies, dosages, etc. to help the user to analyze impacts of the application of the pesticides and the fertilizers on production results; and an operation time period is selected to count the operation area, and a corresponding statistical graph of the operation area is generated, so that it is convenient to know about an operation progress, etc.

Although the specific implementations of the present disclosure have been described as above in combination with the accompanying drawings, the protection scope of the present disclosure is not limited. It should be understood by those skilled in the art that various modifications or transformations made by those skilled in the art without creative work on the basis of the technical solutions of the present disclosure still fall within the protection scope of the present disclosure.

What is claimed is:

1. An Internet-of-Things management and control system for an intelligent orchard, comprising a server, agricultural machinery equipment, an image acquisition apparatus disposed on a site, and sensors, wherein the agricultural machinery equipment, the image acquisition apparatus and the sensors are in communication connection with the server;
wherein the server is configured to implement a fruit tree planting planning module and, in implementing the fruit tree planting planning module, the server is configured to:
acquire regional image data, topographic data and geological environment data;
acquire an orchard planting area, and divide the orchard planting area into grids in sizes adjustable by the user to obtain grid division data;
obtain planting conditions of each grid, wherein the planting conditions comprise light conditions and soil conditions; and
acquire data of species and a planned planting area of fruit trees to be planted, with a minimum planting area of a similar fruit tree area and differences of ideal planting conditions and planting conditions of the fruit trees to be planted as constraints, merge the grids into a plurality of plots according to the planned planting area of the fruit trees to be planted, and obtain species of corresponding fruit trees in each plot;
wherein the server is further configured to implement a disease and pest monitoring module and, in implementing the disease and pest monitoring module, the server is configured to acquire images of the fruit trees and monitor diseases and pests based on a disease and pest recognition model, wherein the disease and pest recognition model comprises a convolution layer, a local response standard layer and a maximum pooling layer;
wherein the server is in communication with the agricultural machinery equipment and sensors by a communication gateway; and
the communication gateway is configured to:
acquire a data message to be sent to the server, and determine a priority to which the data message belongs according to a data source and a preset priority rule by, after unpacking and recombination, performing active encapsulation to form data frames to be pushed to a data link layer, and, after data packets are unpacked, marking priorities on mark bits and, at the same time, uniformly marking the unpacked data packets on marker positions so that the data packets in the same data segment are recognizable when received; and
if the priority is lower, transfer data into a data register for arrangement by queue, and write the data into a message cache area; and when the data stored in the message cache area meets transmission conditions, encapsulate the data stored in the message cache area to generate a message to be sent.

2. The Internet-of-Things management and control system for the intelligent orchard of claim 1, wherein the server is further configured to acquire an agricultural production task plan made by working staff and issue the agricultural production task plan to the corresponding agricultural machinery equipment and working staff.

3. The Internet-of-Things management and control system for the intelligent orchard of claim 1, wherein the server is further configured to monitor meteorological information of a ground surface of an orchard in real time and early warn abnormal weather in local areas in combination with meteorological data collected in real time.

4. The Internet-of-Things management and control system for the intelligent orchard of claim 1, further comprising a client side connected to the server.

* * * * *